United States Patent [19]
Fottinger et al.

[11] Patent Number: 6,087,290
[45] Date of Patent: Jul. 11, 2000

[54] SI-N-SI-BRIDGED METALLOCENES, THEIR PRODUCTION AND USE

[76] Inventors: Klaus Fottinger, Postfach 101251, D-95440, Bayreuth; Helmut G. Alt, Wacholderweg 27, D-95445, Bayreuth, both of Germany; M. Bruce Welch, 4750 Lewis Dr., Bartlesville, Okla. 74006

[21] Appl. No.: 09/233,609

[22] Filed: Jan. 19, 1999

[51] Int. Cl.$^7$ .............................. C07F 17/00; B01J 31/00; C08F 4/642

[52] U.S. Cl. ..................... 502/103; 502/117; 526/128; 526/160; 526/348; 526/351; 526/352; 526/943; 556/11; 556/12; 556/53

[58] Field of Search .................. 556/11, 12, 53; 502/103, 117; 526/160, 943, 128, 348, 351, 352

[56] References Cited

U.S. PATENT DOCUMENTS

| | | | |
|---|---|---|---|
| 5,441,920 | 8/1995 | Welborn, Jr. .................. | 502/103 |
| 5,473,020 | 12/1995 | Peifer et al. .................. | 525/243 |
| 5,492,985 | 2/1996 | Peifer et al. .................. | 526/127 |
| 5,504,223 | 4/1996 | Rosen et al. .................. | 556/7 |
| 5,597,935 | 1/1997 | Jordan et al. .................. | 556/11 |

OTHER PUBLICATIONS

Organometallics 1983, 2, 1808–1814. (M. David Curtis et al).
Organometallics 1995, 14, 177–185. (Santiago Ciruelos et al).
Journal of Organometallic Chemistry 518 (1996) 181–187. (Helmut Naderer et al).

*Primary Examiner*—Porfirio Nazario-Gonzalez
*Attorney, Agent, or Firm*—Edward L. Bowman

[57] ABSTRACT

Novel Si—N—Si bridged metallocenes of the formula [L—Si—Me$_2$NRSiMe$_2$L]MX$_2$ wherein L is a C$_5$H$_4$, C$_9$H$_6$, or C$_{13}$H$_8$ radical, R is alkyl and M is zirconium, titanium, or hafnium, and X is selected from the group consisting of chlorine, bromine, iodine, methyl and diethyl amine, are provided via a novel amine elimination reaction followed by cyclization of the ligand sphere of the amino silyl functionalized metallocene dichloride complex. Further, there is provided novel unbridged metallocene precursors of the formula [RNH—SiMe$_2$—L]$_2$MX$_2$. Such Si—N—Si bridged metallocenes in combination with an organometallic compound of metals of Group IA, IIA, and IIB form a catalyst system which is highly active in the polymerization of alpha-olefins.

22 Claims, No Drawings

SI-N-SI-BRIDGED METALLOCENES, THEIR PRODUCTION AND USE

This invention relates to Si—N—Si-bridged metallocenes. In another aspect this invention relates to catalyst systems for the polymerization of olefins. In another aspect this invention relates to methods for polymerizing olefins using specific types of activated metallocenes which can be referred to as nitrogen bridged metallocenes having three atoms in the bridge.

BACKGROUND OF THE INVENTION

Since the discovery of ferrocene in 1951, a number of metallocenes have been prepared by the combination of compounds prepared from cyclopentadiene-type, indenyl type, and fluorenyl type compounds and various transition metals.

Many of such metallocenes have been found useful in catalyst systems for the polymerization of olefins. It has been noted in the art that variations in the chemical structure of such cyclopentadienyl-type metallocenes can have significant effects upon the suitability of the metallocene as a polymerization catalyst. For example, the size and location of substituents on cyclopentadienyl-type ligands has been found to affect the activity of the catalyst, the stereoselectivity of the catalyst, the stability of the catalyst, or various properties of the resulting polymer. However, the effects of various substituents is still largely an empirical matter; that is, experiments must be conducted in order to determine just what effect a particular variation in the chemical structure of the metallocene will have upon its behavior as a polymerization catalyst.

While there are many references in the prior art which contain broad general formulas that encompass a vast number of unbridged and bridged metallocenes, it is considered unlikely that all of the metallocenes within the broad disclosures of such publications have actually been prepared and evaluated for the polymerization effects.

In addition, many of the metallocenes have been found not to be sufficiently active in the polymerization of olefins to be of significant commercial interest. Prior to the present applicants' work, there does not appear to have been any work which either provides a N-bridged metallocene or suggests what effect a nitrogen bridge would have on a bridged cyclopentadienyl metallocene.

It is thus an object of the present invention to provide new Si—N—Si bridged metallocenes.

Another object of the present invention is to provide novel metallocene complexes which are useful for the production of Si—N—Si bridged metallocenes.

Still another object of the present invention is to provide a process for the production of Si—N—Si bridged metallocenes.

A still further object of this invention is to provide a novel catalyst system having as a component thereof a Si—N—Si bridged metallocene.

A still further object of this invention is to provide a process for the production of olefin polymers using a catalyst system wherein a component of same is a Si—N—Si bridged metallocene.

Other aspects, objects, and the several advantages of the present invention will be apparent in view of the following specification and claims.

SUMMARY OF THE INVENTION

In accordance with the present invention, we have discovered that novel Si—N—Si bridged metallocene dichloride complexes can be produced using a new type of amine elimination reaction followed by a cyclization of the ligand sphere of the amino silyl functionalized metallocene dichloride complexes.

Accordingly, in one embodiment of the present invention there is provided a novel Si—N—Si-bridged metallocene of the formula [L—SiMe$_2$—NR—SiMe$_2$L]MX$_2$ wherein L is a C$_5$H$_4$, C$_9$H$_6$ or C$_{13}$H$_8$ radical, R is an alkyl radical, M is selected from the group consisting of titanium, hafnium, and zirconium and X is selected from the group consisting of chlorine, bromine, iodine, methyl and diethylamine.

In another embodiment of the present invention, there is provided a novel precursor of the formula [RHNMe$_2$Si—L]$_2$MX$_2$ wherein L, R, M and X are as above defined.

In another embodiment of the present invention, there is provided a process for the production of novel Si—N—Si bridged metallocenes as well as novel precursors for same.

In still another embodiment of the present invention, there is provided a novel catalyst system formed by the activation of a Si—N—Si bridged metallocene with a cocatalyst suitable for the polymerization of olefinic monomers.

Also, in a further embodiment of the present invention, there is provided a process for the polymerization of olefins using a catalyst system having as a component therein a Si—N—Si bridged metallocene complex.

DETAILED DESCRIPTION OF THE INVENTION

The novel metallocenes provided in accordance with the present invention contain a Si—N—Si bridge so that the L ligands that are bound to the metal are further bound to each other.

Such novel metallocene compounds are of the formula [L—SiMe$_2$—NR—SiMe$_2$—L]MX$_2$ wherein L is a C$_5$H$_4$, C$_9$H$_6$, or C$_{13}$H$_8$ radical, R is an alkyl radical, and M is selected from the group consisting of titanium, hafnium, and zirconium and X is selected from the group consisting of chlorine, bromine, iodine, methyl and diethylamine.

DEFINITIONS

The symbol "L" as used herein is intended to mean a C$_5$H$_4$, C$_9$H$_6$, or C$_{13}$H$_8$ radical.

The term "alkyl radical" as used herein is intended to mean 1–20 carbon alkyl radicals having two hydrogens bonded to the 1 carbon thereof. The currently preferred alkyl radicals have 1 to 4 carbon atoms.

The term "1 carbon" as used herein is intended to mean that carbon adjacent to the N atoms of the Si—N—Si bridge.

The term "Si—N—Si bridge" as used herein is intended to mean a bridge of the formula —SiMe$_2$—NR—SiMe$_2$— wherein R is an alkyl radical and Me is methyl.

One suitable process for the production of the novel Si—N—Si bridged metallocene complexes in accordance with the present invention can be conveniently illustrated by the following reaction equation for the production of the novel ansa-zirconocene complex:

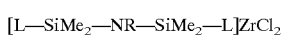

wherein R is n-butyl and L is a C$_5$H$_4$ radical.

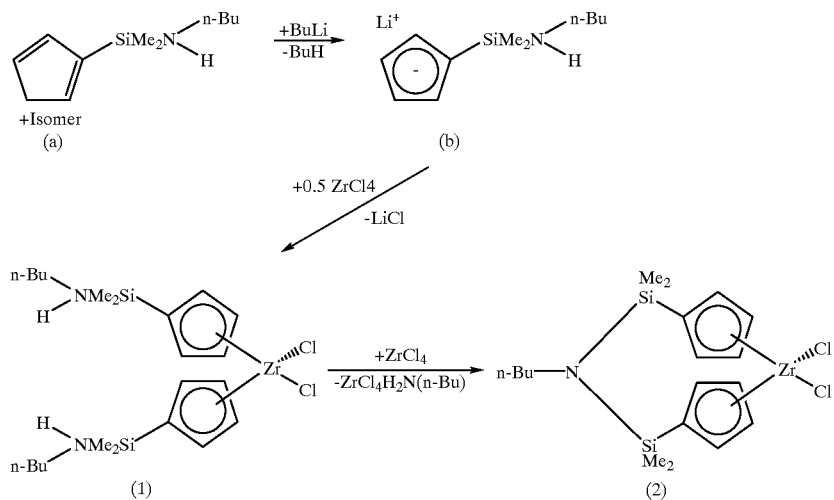

In the reaction scheme as illustrated, the ligand precursor (a) is reacted with an equimolar amount of butyllithium to effect the selective lithiation of the five-membered ring. The corresponding metallocene dichloride complex (1) is formed almost quantitatively by reacting the singly deprotonized ligand precursor (b) with half an equivalent of $ZrCl_4$.

By reacting complex (1) with another equivalent of zirconium tetrachloride, an immediate ring closure occurs with intramolecular elimination of the amino adduct $ZrCl_4H_2N''Bu$ to form the new ansa-zirconocene complex (2). The complex (2) is produced in quantitative yields via this reaction.

Alternatively, the synthesis of Si—N—Si bridged complexes can also be performed in a convenient "one-pot reaction" as illustrated by the following reaction mechanism wherein R is n-butyl.

formed after intramolar amine elimination as zirconium tetrachloride adduct $ZrCl_4H_2NR$.

The corresponding ansa-titanocene and ansa-hafnocene dichloride compounds can also be formed by varying the amounts of metal tetrachloride used.

As disclosed herein for the first time is the preparation of ansa-metallocene dichloride complexes of titanium, zirconium, and hafnium with the three bridge atoms Si—N—Si. For the first time, the element nitrogen is used as a bridge atom with ansa-metallocene dichloride complexes. This is made possible, above all, by a novel amine elimination reaction with a subsequent cyclization of the already existing ligand sphere of the aminosilyl-functionalized metallocene dichloride complexes.

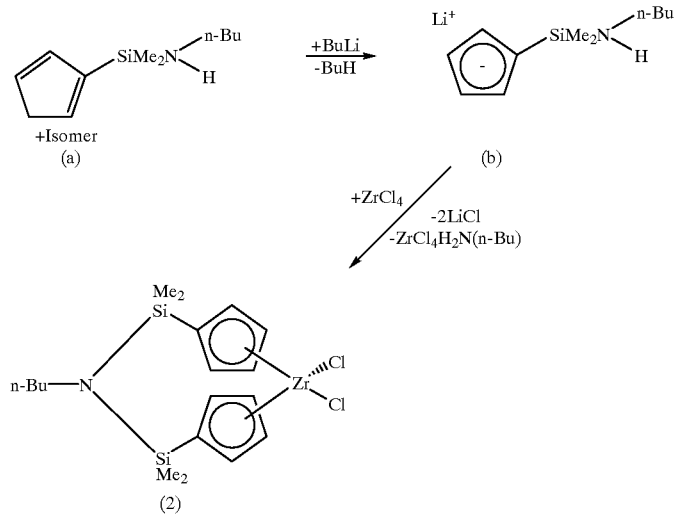

The organolithium ligand precursor (b) is reacted with a stoichiometric amount of zirconium tetrachloride. The intermediary formed unbridged zirconium dichloride complex further reacts with excess zirconium tetrachloride. The Si—N—Si bridged zirconocene dichloride complex (2) is If the alkyl substituted complex is reacted with an equivalent of zirconium tetrachloride, then an immediate ring closure takes place with an intramolecular elimination of the amine adduct $ZrCl_4H_2N$ alkyl. The new ansa-zirconocene complex $(C_5H_4$—$SiMe_2N(R)SiMe_2$—$C_5H_4)ZrCl_2$ is formed in quantitative yield.

A degradation reaction of this type is novel. An innovative synthesis potential is available with this specific amine elimination reaction, which enriches the broad variety of metallocene dichloride complexes of the fourth group by a new type of compound.

In this way, a large number of new complexes with different aromatic ligands and novel, alkyl-substituted Si—N—Si bridged elements can be synthesized.

In one presently preferred embodiment of the present invention in the Si—NR—Si bridged metallocene as well as in the unbridged precursor for same, R is a radical selected from the group consisting of methyl, propyl, octyl, prop-2-enyl, 2-methoxyethanyl, 2-phenylethyl, 3-phenylpropanyl and 4-phenylbutanyl.

The preparation of the ansa-complexes of the (L—SiMe$_2$N(R)SiMe$_2$—L)ZrCl$_2$ can also be easily carried out by means of a "one-pot reaction."

The bifunctional, proaromatic ligand precursor is first brought to reaction with the equimolar quantity of butyllithium. After a completed, selective deprotonation of the aromatic five-membered ring, the lithium-organic ligand precursor is reacted with the stoichiometric quantity of zirconium tetrachloride. The intermediately formed unbridged aminosilyl-substituted zirconium dichloride complex (C$_5$H$_4$—SiMe$_2$N(H)R)ZrCl$_2$ reacts with the excess zirconium tetrachloride. With the intramolecular amine splitting in the form of the zirconium tetrachloride adduct ZrCl$_4$H$_2$NR, the corresponding SiMe$_2$N(R)SiMe$_2$-bridged zirconocene dichloride complex is formed in a direct way. By varying the metal tetrachloride, the individual ansa-titanocene and ansa-hafnocene dichloride compounds are accessible.

In comparison to the unbridged metallocene dichloride complexes of the fourth group, the Si—N—Si-bridged complexes are characterized, above all, by the higher activities.

A variation of the central metal of the ansa-complexes influences their polymerization behavior in a manner similar to that with the corresponding unbridged metallocene derivatives.

The resulting metallocenes can be recovered and purified using conventional techniques known in the art such as filtration, extraction, crystallization, and recrystallization. It is generally desirable to recover the metallocene in a form that is free of any substantial amount of by-product impurities. Accordingly, recrystallization and fractional crystallization to obtain relatively pure metallocenes is desirable. Dichloromethane has been found to be particularly useful for such recrystallizations. Since the stability of the various metallocenes varies, it is generally desirable to use the metallocenes soon after their preparation or at least to store the metallocene under conditions favoring their stability. For example, the metallocenes can generally be stored in the dark at low temperature, i.e. below 0° C., in the absence of oxygen and water.

The inventive Si—N—Si bridged metallocenes can be used in combination with a suitable cocatalyst for the polymerization of olefinic monomers. In such processes, the metallocene or the cocatalyst can be employed on a solid insoluble particular support.

Examples of suitable cocatalyst include, generally, any of those cocatalyst which have in the past been employed in conjunction with transition metal containing metallocene olefin polymerization catalysts. Some typical examples include organometallic compounds of metals of Groups IA, IIA, and IIIB of the Periodic Table. Examples of such compounds have included organometallic halide compounds, organometallic hydrides and even metal hydrides. Some specific examples include triethylaluminum, triisobutyl aluminum, diethylaluminum chloride, diethylaluminum hydride, and the like.

The currently most preferred cocatalyst is an aluminoxane. Such compounds include those compounds having repeating units of the formula

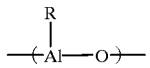

where R is an alkyl groups generally having 1 to 5 carbon atoms.

Aluminoxanes, also sometimes referred to as poly (hydrocarbyl aluminum oxides) are well known in the art and are generally prepared by reacting an organo hydrocarbylaluminum compound with water. The currently preferred cocatalysts are prepared either from trimethylaluminum or triethylaluminum, sometimes referred to as poly (methylaluminum oxide) or (MAO) and poly (ethylaluminum), respectively.

The Si—N—Si bridged metallocenes in combination with the cocatalyst can be used to polymerize olefins, especially alpha olefins having 2 to 12 carbon atoms. Often such polymerizations would be carried out in a homogeneous system in which the catalyst and cocatalyst were soluble; however, it is within the scope of the present invention to carry out the polymerizations in the presence of supported or insoluble particular forms of the catalyst and/or cocatalyst. The catalyst is thus considered suitable for solution, slurry, or gas phase polymerization. It is within the scope of the invention to use a mixture of two or more of the inventive indenyl-containing metallocenes or a mixture of an inventive indenyl-containing metallocene with one or more other cyclopentadienyl-type metallocenes.

The Si—N—Si bridged metallocenes when used with aluminoxane are particularly useful for the polymerization of ethylene in the presence or absence of other olefins. Examples of other olefins that might be present include mono-unsaturated aliphatic alpha-olefins having 3 to 10 carbon atoms. Examples of such olefins include propylene, butene-1, pentene-1, 3-methylbutene-1, hexene-1, 4-methylpentene-1, 3-methylpentene-1, heptene-1, octene-1, decene-1, 4,4-dimethyl-1-pentene, 4,4-diethyl-1-hexene, 3,4-dimethyl-1-hexene, and the like and mixtures thereof.

The polymerizations can be carried out under a wide range of conditions depending upon the particular metallocene employed, and the results desired. It is considered that generally any of the polymerization procedures used in the prior art with any transition metal based catalyst systems can be employed with the present inventive indenyl-containing metallocenes.

The amount of cocatalyst can vary over a wide range. It is currently preferred for the molar ratio of the aluminum in the aluminoxane to the transition metal in the metallocene to be in the range of about 0.1:1 to about 100,000:1 and more preferably about 5:1 to about 15,000:1. In many cases, the polymerizations would be carried out in the presence of liquid diluents which do not have an adverse affect upon the catalyst system. Examples of such liquid diluents include propane, butane, isobutane, pentane, hexane, heptane, octane, cyclohexane, methylcyclohexane, toluene, xylene, and the like. The polymerization temperature can vary over a wide range, temperatures typically would be in the range of about −60° C. to about 300° C., more preferably in the range of about 20° C. to about 160° C. Typically the pressure would be in the range of from about 1 to about 500 atmospheres or greater.

The polymers produced with this invention have a wide range of uses that will be apparent to those skilled in the art from the physical properties of the respective polymer.

A further understanding of the present invention, its various aspects, objects and advantages will be provided by the following examples.

In the following examples, the metallocene preparations were carried out routinely using the Schlenk technique, with strict exclusion of air and moisture, by means of purified and dried inert gas.

The solvents which were used were dried over a sodium/potassium alloy or over phosphorus pentoxide in the case of dichloromethane and distilled in circulation equipment under an inert atmosphere. Toluene was additionally distilled over phosphorus pentoxide and dichloromethane was distilled over calcium hydride.

The viscosity average molecular weight of the polymers were determined using an Ubbelohde capillary viscometer in cis/tran-decalin at 135+/−0.1° C. The samples were dried under vacuum prior to the measurement and then weighed out into small flasks that could be sealed. The polymers were then dissolved in a precisely measured quantity of the decalin within three or four hours at 140° to 105° C. Any insoluble material was filtered out using glass wool. Calibration curves for three different polymer concentrations were evaluated for the determination of the viscosity average molecular weight, i.e. $M_n$. E.I mass spectra were recorded using a varion MAT CH7 mass spectrometer (direct inlet, EI=70 V).

EXAMPLES

Example I $C_5H_5SiMe_2NH^nBu$ (a)

At 0° C., 10 mmol Li[NH$^n$Bu] are added in portions to 10 mmol $C_5H_5SiMe_2Cl$, dissolved in 100 ml Et$_2$O. After the addition is completed, the mixture is stirred for an additional 12 hours. Subsequently, it is filtered over Na$_2$SO$_4$, the solvent is removed and the remaining crude product is distilled (56–58° C., membrane vacuum). EI-MS: m/e=195 (M$^+$).

Example II

Li[C$_5$H$_4$SiMe$_2$NH$^n$Bu] (b)

At −78° C., 5 mmol ligand precursor (a) of Example I in 50 ml diethylether are mixed with 5 mmol BuLi (1.6 M in hexane). The mixture is brought to room temperature and stirred for 12 hours.

Example III

[C$_5$H$_4$—SiMe$_2$—NH$^n$Bu]$_2$ZrCl$_2$ (1)

At room temperature, 2.5 mmol ZrCl$_4$ are added in portions to 5 mmol ligand precursor (b) of Example II in 50 ml diethylether. After the addition is completed, the mixture is stirred for an additional 12 hours. Subsequently, the reaction mixture is dried under vacuum. Complex 1 is dissolved in pentane and filtered over Na$_2$SO$_4$. The solution is then reduced in volume, and the complex crystallized at −30° C. to provide the bis(alkylaminodimethyl silyl) zirconium dichloride in 80–95% yield. EI-MS: m/e=548 (M$^+$).

Example IV

[C$_5$H$_4$—SiMe$_2$N($^n$Bu)SiMe$_2$—C$_5$H$_4$]ZrCl$_2$ (2)

Variant A: 1 mmol of complex 1 of Example III is dissolved in 20 ml diethylether, mixed with 1 mmol ZrCl$_4$ at room temperature and stirred for 12 hours. Subsequently, the reaction batch is brought to dryness under vacuum, the complex dissolved in pentane and filtered over Na$_2$SO$_4$. After the solvent removal, ansa-complex 2 is obtained quantitatively.

Variant B: at −78° C., 5 mmol ligand precursor a of Example I in 50 ml diethylether are mixed with 5 mmol BuLi (1.6 M in hexane). The mixture is brought to room temperature and stirred for 12 hours. 5 mmol ZrCl$_4$ are added to the suspension and it is stirred for further 12 hours. Subsequently, the reaction batch is brought to dryness under vacuum, and complex 2 dissolved in pentane. The pentane solution is filtered over Na$_2$SO$_4$ and reduced in volume, and the complex is crystallized at —30° C. EI-MS: m/e=475 (M$^+$).

Example V

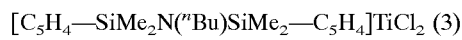
[C$_5$H$_4$—SiMe$_2$N($^n$Bu)SiMe$_2$—C$_5$H$_4$]TiCl$_2$ (3)

At −78° C., 5 mmol ligand precursor a of Example I in 50 ml diethylether are mixed with 5 mmol BuLi (1.6 M in hexane). The mixture is brought to room temperature and stirred for 12 hours. 5 mmol TiCl$_4$ are added to the suspension and it is stirred for further 12 hours. Subsequently, the reaction batch is brought to dryness under vacuum, and the complex (3) dissolved in pentane, and the complex is crystallized at −30° C. EI-MS: m/e=433 (M$^+$).

Example VI

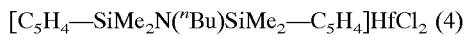
[C$_5$H$_4$—SiMe$_2$N($^n$Bu)SiMe$_2$—C$_5$H$_4$]HfCl$_2$ (4)

At −78° C., 5 mmol ligand precursor a of Example I in 50 ml diethylether are mixed with 5 mmol BuLi (1.6 M in hexane). The mixture is brought to room temperature and stirred for 12 hours. 5 mmol HfCl$_4$ are added to the suspension and it is stirred for further 12 hours. Subsequently, the reaction batch is brought to dryness under vacuum, and the complex (4) dissolved in pentane, and the complex is crystallized at −30° C. EI-MS: m/e=565 (M$^+$).

Example VII

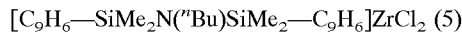
[C$_9$H$_6$—SiMe$_2$N($^n$Bu)SiMe$_2$—C$_9$H$_6$]ZrCl$_2$ (5)

At −78° C., 5 mmol ligand precursor CH—SiMeNH (nBu) in 50 ml diethylether are mixed with 5 mmol BuLi (1.6 M in hexane). The mixture is brought to room temperature and stirred for 12 hours. 5 mmol ZrCl$_4$ are added to the suspension and it is stirred for further 12 hours. Subsequently, the reaction batch is brought to dryness under vacuum, and the complex (5) dissolved in pentane, and the complex is crystallized at −30° C. EI-MS: m/e=551 (M$^+$).

Example VIII

A series of Si—N—Si bridged metallocene complexes of the present invention were employed in a series of polymerization runs wherein ethylene (dried over alumina) was polymerized in a 1 liter metal autoclave from the Buche Company (model 280 BEP).

The complexes were activated by addition of a 2000 fold molar excess of methylaluminoxane (MAO) obtained as a 30% solution in toluene from the Witco Company (Bergkamen).

The autoclave was filled with 500 ml pentane and 3 ml MAO solution and stirred for 10 minutes in dry pentane. After adding the active complex (approximately 1 mg), the polymerizations were performed under an ethylene pressure of 10 bars and at a temperature of 60° C. over a period of one hour. The polymerization was interrupted by releasing the pressure in the reactor. The polymer samples were subsequently washed with MeOH/HCl and dried under vacuum.

The following results were achieved.

TABLE 1

| Run No. | R | M | L | Activity kg[PE] mmol[M]h | $M_n$ ($10^3$ g/mol) |
|---|---|---|---|---|---|
| 1 | Propyl | Zr | $C_5H_4$ | 195 | 480 |
| 2 | Methyl | Zr | $C_5H_4$ | 274 | 750 |
| 3 | Butyl | Zr | $C_5H_4$ | 215 | 420 |
| 4 | Butyl | Ti | $C_5H_4$ | 45 | 130 |
| 5 | Butyl | Hf | $C_5H_4$ | 14 | 1650 |
| 6 | Butyl | Zr | $C_9H_6$ | 140 | 1150 |

As can be seen from the above results, the substitution of the nitrogen atom exerts a great influence on the polymerization activities of the catalysts and on the characteristics of the polyethylene obtained.

That which is claimed is:

1. A Si—N—Si bridged metallocene complex of the formula [L—SiMe$_2$NRSiMe$_2$L]MX$_2$ wherein L is a $C_5H_4$, $C_9H_6$, or $C_{13}H_8$ radical; R is an alkyl radical; and M is selected from the group consisting of titanium, hafnium, and zirconium; and X is selected from the group consisting of chlorine, bromine, iodine, methyl and diethyl amine.

2. A metallocene complex in accordance with claim 1 wherein L is cyclopentadienyl.

3. A metallocene complex in accordance with claim 2 wherein M is zirconium.

4. A metallocene complex in accordance with claim 1 wherein R is a member of the group consisting of methyl, propyl, octyl, prop-2-enyl, 2-methoxyethanyl, 3-phenylethyl, 3-phenylpropanyl, and 4-phenylbutanyl.

5. A metallocene complex in accordance with claim 1 which is bis(cyclopentadienyl dimethylsilyl) alkyl amide zirconium dichloride.

6. The metallocene complex in accordance with claim 5 wherein said alkyl is butyl.

7. A process for the production of a Si—N—Si bridged metallocene complex of the formula [LSiMe$_2$NRSiMe$_2$]MX$_2$ wherein L is a $C_5H_4$, $C_9H_6$, or $C_{13}H_8$ radical; R is an alkyl radical; and M is selected from the group consisting of titanium, hafnium, and zirconium; and X is selected from the group consisting of chlorine, bromine, iodine, methyl and diethyl amine which comprises (a) contacting a bidentate ligand precursor of the formula L—SiMe$_2$—NHR with an equimolar amount of organolithium compound of the formula RLi so as to form a single deprotonized ligand precursor of the formula Li[L—SiMe$_2$NHR];

(b) contacting the single deprotonized ligand precursor of step (a) with half an equivalent of MX$_4$ so as to produce a complex of the formula

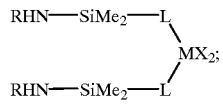

(c) reacting the complex of step (b) with another equivalent of MX$_4$ so as to form an ansa-complex of the formula [L—SiMe$_2$NR—SiMe$_2$—L]MX$_2$; and (d) thereafter recovering the ansa-metallocene complex as a product of the process.

8. A process in accordance with claim 7 wherein R is butyl and M is zirconium and X is chlorine.

9. A process for the production of a metallocene complex of the formula [L—SiMe$_2$—NRSiMe$_2$L]MX$_2$ wherein L is a $C_5H_4$, $C_9H_6$, or $C_{13}H_8$ radical; R is an alkyl radical; and M is selected from the group consisting of titanium, hafnium, and zirconium; and X is selected from the group consisting of chlorine, bromine, iodine, methyl and diethyl amine which comprises (a) contacting a bidentate ligand precursor of the formula L—SiMe$_2$—NHR with an equimolar amount of organolithium compound of the formula RLi so as to form a single deprotonized ligand precursor of the formula Li$^+$[L—SiMe$_2$NHR]$^-$;

(b) contacting the single deprotonized ligand precursor of step (a) with a stoichiometric amount of MX$_4$ wherein M is selected from the group consisting of zirconium, titanium, and hafnium so as to produce an ansa-complex of the formula [L-SiMe$_2$NR—SiMe$_2$—L]MX$_2$; and (c) thereafter recovering the ansa-metallocene complex of step (b) as a product of the process.

10. A process in accordance with claim 9 wherein R is butyl and M is zirconium and X is chlorine.

11. A complex of the formula [RNH—Me$_2$Si—L]$_2$MX wherein R is an alkyl radical; M is selected from the group consisting of titanium, hafnium and zirconium; and X is selected from the group consisting of chlorine, bromine, iodine, methyl and diethylamine and L is a $C_5H_4$, $C_9H_6$ or $C_{13}H_8$ radical.

12. A complex in accordance with claim 11 wherein M is zirconium.

13. A complex in accordance with claim 12 wherein R is n-butyl and X is chlorine.

14. A process for the production of a complex of the formula [RNHMe$_2$SiL]MX$_2$ wherein R is an alkyl radical; M is selected from the group consisting of titanium, hafnium and zirconium; and X is selected from the group consisting of chlorine, bromine, iodine, methyl and diethylamine which comprises (a) contacting a bidentate ligand precursor of the formula L—SiMe$_2$—NHR with an equimolar amount of an organolithium compound of the formula RLi so as to form a single deprotonized ligand precursor of the formula Li$^+$[L—SiMe$_2$NHR]$^-$;

(b) contacting the single deprotonized ligand precursor of step (a) with half an equivalent of MX$_4$ so as to produce a complex of the formula

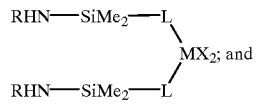

(c) thereafter recovering the complex of step (b) as a product of the process.

15. A process according to claim 14 wherein R is butyl and M is zirconium and X is chlorine.

16. A catalyst comprising (a) complex of the formula [L—SiMe$_2$NRSiMe$_2$L]MX$_2$ wherein L is a $C_5H_4$, $C_9H_6$, or $C_{13}H_8$ radical; R is an alkyl radical; and M is selected from the group consisting of titanium, hafnium, and zirconium; and X is selected from the group consisting of chlorine, bromine, iodine, methyl and diethyl amine, and (b) a cocatalyst selected from organometallic compounds of metals of Groups IA, IIA, and IIB.

17. A catalyst according to claim 16 wherein said cocatalyst is organoaluminoxane compound.

18. A catalyst according to claim 17 wherein said cocatalyst is methylaluminoxane.

19. A process for forming a polymer comprising contacting an unsaturated monomer selected from alpha olefins having 2 to 10 carbon atoms under suitable polymerization conditions with a catalyst composition resulting from the combination of a Si—N—Si bridged metallocene of the formula [L—SiMe$_2$NRSiMe$_2$L]MX$_2$ wherein L is a C$_5$H$_4$, C$_9$H$_6$, or C$_{13}$H$_8$ radical; R is a alkyl radical; and M is selected from the group consisting of titanium, hafnium, and zirconium; and X is selected from the group consisting of chlorine, bromine, iodine, methyl and diethyl amine and a cocatalyst selected from organometallic compounds of metals of Groups IA, IIA, and IIB.

20. A process according to claim 17 wherein said cocatalyst is an organoaluminoxane compound.

21. A process according to claim 18 wherein said cocatalyst is methylaluminoxane.

22. A process according to claim 18 wherein said olefin is ethylene.

* * * * *

UNITED STATES PATENT AND TRADEMARK OFFICE
CERTIFICATE OF CORRECTION

PATENT NO.   : 6,087,290                                    Page 1 of 1
DATED        : July 11, 2000
INVENTOR(S)  : Klaus Fottinger et al It is certified that error appears in the above-identified patent and that said Letters Patent is hereby corrected as shown below:

Column 9,
Line 44, please delete "[LSiMe$_2$NRSiMe$_2$]" and insert therefor
--- [LSiMe$_2$NRSiMe$_2$L] ---.

Signed and Sealed this

Fourteenth Day of August, 2001

*Attest:*

*Attesting Officer*

NICHOLAS P. GODICI
*Acting Director of the United States Patent and Trademark Office*